United States Patent
Xie et al.

(10) Patent No.: US 9,904,456 B2
(45) Date of Patent: Feb. 27, 2018

(54) GESTURE-BASED VISUALIZATION OF DATA GRID ON MOBILE DEVICE

(71) Applicants: Yingyu Xie, Shanghai (CN); Youdong Miao, Shanghai (CN)

(72) Inventors: Yingyu Xie, Shanghai (CN); Youdong Miao, Shanghai (CN)

(73) Assignee: Business Objects Software Ltd., Dublin (IE)

( * ) Notice: Subject to any disclaimer, the term of this patent is extended or adjusted under 35 U.S.C. 154(b) by 345 days.

(21) Appl. No.: 14/558,017

(22) Filed: Dec. 2, 2014

(65) Prior Publication Data

US 2016/0154575 A1 Jun. 2, 2016

(51) Int. Cl.
| | |
|---|---|
| G06F 3/0481 | (2013.01) |
| G06F 3/0488 | (2013.01) |
| G06F 17/24 | (2006.01) |
| G06F 3/0486 | (2013.01) |
| G06F 3/0484 | (2013.01) |

(52) U.S. Cl.
CPC .......... G06F 3/0486 (2013.01); G06F 3/0481 (2013.01); G06F 3/04842 (2013.01); G06F 3/04883 (2013.01); G06F 3/04886 (2013.01); G06F 17/246 (2013.01)

(58) Field of Classification Search
CPC .... G06F 17/245; G06F 17/246; G06F 3/0486; G06F 3/04842; G06F 3/04883; G06F 3/04886; G06F 3/0481
USPC ................................................. 715/215, 863
See application file for complete search history.

(56) References Cited

U.S. PATENT DOCUMENTS

| | | | | |
|---|---|---|---|---|
| 5,611,034 A | * | 3/1997 | Makita | G06T 11/206 345/440 |
| 5,632,009 A | * | 5/1997 | Rao | G06F 3/023 715/201 |
| 6,628,312 B1 | * | 9/2003 | Rao | G06F 17/245 715/713 |
| 6,820,111 B1 | * | 11/2004 | Rubin | G06F 17/30884 707/E17.114 |
| 7,420,562 B2 | * | 9/2008 | Shinohara | G06F 17/211 345/418 |
| 7,788,606 B2 | * | 8/2010 | Patel | G06F 3/04883 345/179 |
| 8,239,765 B2 | * | 8/2012 | Alsbury | G06F 1/1626 715/273 |

(Continued)

*Primary Examiner* — Andrew Tank
(74) *Attorney, Agent, or Firm* — Fountainhead Law Group P.C.

(57) ABSTRACT

A mobile device user may quickly and naturally explore data received in a data grid from a remote database. A mobile device engine receives the database data including dimensions and measures, in a grid format comprising rows and columns of numerals. In response to a recognized suite of user gestures (e.g., horizontal swipe, vertical swipe, drag and drop), the engine may modify the data grid to provide a changed visualization, without the user device having to re-access a remote database server. In one example, a touch swipe down a column of the data grid may result in display of column data in vertical bar chart form, rather than exclusively as numerical values. Other user recognized gestures can include a user dragging and dropping one column into another, with horizontal bar visualizations combined into stacked bar charts that serve to rapidly apprise the user of a relative magnitude of column information.

17 Claims, 19 Drawing Sheets

(56) References Cited

U.S. PATENT DOCUMENTS

| | | | |
|---|---|---|---|
| 8,527,909 B1* | 9/2013 | Mullany | G06F 3/0484 345/173 |
| 2006/0074866 A1* | 4/2006 | Chamberlain | G06F 17/246 |
| 2006/0125827 A1* | 6/2006 | Adereth | G06F 17/30554 345/440 |
| 2007/0101252 A1* | 5/2007 | Chamberlain | G06F 17/212 715/220 |
| 2007/0268311 A1* | 11/2007 | Smith | G06Q 10/10 345/629 |
| 2008/0104498 A1* | 5/2008 | Molander | G06F 17/246 715/212 |
| 2009/0100370 A1* | 4/2009 | Martone | G06F 17/245 715/777 |
| 2009/0144318 A1* | 6/2009 | Modzelewski | G06F 17/30569 |
| 2009/0160861 A1* | 6/2009 | Nakano | G06F 17/246 345/440 |
| 2009/0282325 A1* | 11/2009 | Radakovitz | G06F 17/246 715/217 |
| 2011/0163968 A1* | 7/2011 | Hogan | G06F 3/04883 345/173 |
| 2011/0289397 A1* | 11/2011 | Eastmond | G06F 3/0485 715/212 |
| 2012/0013539 A1* | 1/2012 | Hogan | G06F 3/04883 345/173 |
| 2012/0013540 A1* | 1/2012 | Hogan | G06F 3/04883 345/173 |
| 2012/0180002 A1* | 7/2012 | Campbell | G06F 17/246 715/863 |
| 2012/0272186 A1* | 10/2012 | Kraut | G06F 3/0488 715/810 |
| 2012/0324329 A1* | 12/2012 | Ceponkus | G06F 3/0485 715/227 |
| 2013/0067306 A1* | 3/2013 | Bhargav | G06F 17/246 715/220 |
| 2013/0145244 A1* | 6/2013 | Rothschiller | G06F 17/212 715/212 |
| 2014/0033093 A1* | 1/2014 | Brauninger | G06F 3/04883 715/765 |
| 2014/0214804 A1* | 7/2014 | Han | G06F 17/30554 707/722 |
| 2015/0066930 A1* | 3/2015 | Tibrewal | G06F 17/30598 707/737 |
| 2015/0135113 A1* | 5/2015 | Sekharan | G06F 3/0488 715/771 |
| 2015/0169531 A1* | 6/2015 | Campbell | G06F 17/246 715/212 |
| 2016/0055232 A1* | 2/2016 | Yang | G06F 17/30601 707/740 |
| 2016/0062607 A1* | 3/2016 | Lunceford | G06F 3/0482 715/845 |
| 2016/0117308 A1* | 4/2016 | Haider | G06F 17/212 715/217 |

* cited by examiner

| D1 ▾ | D2 | D3 | D4 | M1 | M2 | M3 | M4 | M5 | M6 |
|---|---|---|---|---|---|---|---|---|---|
| category1 | ABC | ABC | ABC | xxx | xxx | xxx | xxx | xxx | xxx |
| category2 | ABC | ABC | ABC | xxx | xxx | xxx | xxx | xxx | xxx |
| category3 | ABC | ABC | ABC | xxx | xxx | xxx | xxx | xxx | xxx |
| category4 | ABC | ABC | ABC | xxx | xxx | xxx | xxx | xxx | xxx |
| category5 | ABC | ABC | ABC | xxx | xxx | xxx | xxx | xxx | xxx |
| category6 | ABC | ABC | ABC | xxx | xxx | xxx | xxx | xxx | xxx |
| category7 | ABC | ABC | ABC | xxx | xxx | xxx | xxx | xxx | xxx |
| category8 | ABC | ABC | ABC | xxx | xxx | xxx | xxx | xxx | xxx |
| category9 | ABC | ABC | ABC | xxx | xxx | xxx | xxx | xxx | xxx |
| category10 | ABC | ABC | ABC | xxx | xxx | xxx | xxx | xxx | xxx |
| category11 | ABC | ABC | ABC | xxx | xxx | xxx | xxx | xxx | xxx |

| D1 → | D2 | D3 | D4 | M1 | M2 | M3 | M4 |
|---|---|---|---|---|---|---|---|
| category1 | ABC | ABC | ABC | xxx | xxx | xxx | xxx |
| category2 | ABC | ABC | ABC | xxx | xxx | xxx | xxx |
| category3 | ABC | ABC | ABC | xxx | xxx | xxx | xxx |
| category4 | ABC | ABC | ABC | xxx | xxx | xxx | xxx |
| category5 | ABC | ABC | ABC | xxx | xxx | xxx | xxx |
| category6 | ABC | ABC | ABC | xxx | xxx | xxx | xxx |
| category7 | ABC | ABC | ABC | xxx | xxx | xxx | xxx |
| category8 | ABC | ABC | ABC | xxx | xxx | xxx | xxx |
| category9 | ABC | ABC | ABC | xxx | xxx | xxx | xxx |

| ● D1 ▼ | D2 | D3 | D4 | M1, M2, M3, M4 |
|---|---|---|---|---|
| category1 | ABC | ABC | ABC | |
| category2 | ABC | ABC | ABC | |
| category3 | ABC | ABC | ABC | |
| category4 | ABC | ABC | ABC | |
| category5 | ABC | ABC | ABC | |
| category6 | ABC | ABC | ABC | |
| category7 | ABC | ABC | ABC | |
| category8 | ABC | ABC | ABC | |
| category9 | ABC | ABC | ABC | |

```
/**
 * @param {Object} categoryContext //Category context for category axis layer.
 * @param {Boolean} isAdd//True if this value axis is added to another.
 **/
    showVisulizationOnCategoryAxis = function(categoryContext, isAdd)

/**
 * @param {Object} valueAxisContext//Value context for value axis layer.
 * @param {Boolean} isAdd//True if this value axis is added to another.
 **/
    showVisulizationOnValueAxis = function(valueAxisContext, isAdd)
```

FIG. 8

| City | Year | Margin | Sale revenue | Sales Amount |
|---|---|---|---|---|
| Austin | 2009 | | 3930 | 2100 |
| Austin | 2011 | | 9861.9 | 5200 |
| Austin | 2010 | | 498 | 200 |
| Boston | 2009 | | 422.3 | 200 |
| Boston | 2011 | | 12677.1 | 6100 |
| Boston | 2010 | | 1656.2 | 700 |
| Colorado Springs | 2009 | | 1087 | 900 |
| Colorado Springs | 2011 | | 6724 | 3800 |
| Colorado Springs | 2010 | | 2988 | 1200 |
| Chicago | 2010 | | 4890.4 | 2000 |
| Chicago | 2009 | | 2281 | 1000 |
| Chicago | 2011 | | 18406.1 | 7900 |
| Dallas | 2009 | | 1580.9 | 700 |
| Dallas | 2011 | | 10994.6 | 5100 |
| Dallas | 2010 | | 5695.6 | 2500 |
| Houston | 2009 | | 13332.1 | 7100 |
| Houston | 2011 | | 28733 | 14400 |
| Houston | 2010 | | 129 | 100 |
| Los Angeles | 2009 | | 5934.2 | 3000 |
| Los Angeles | 2011 | | 17585.2 | 8200 |
| Los Angeles | 2010 | | 527.2 | 300 |

FIG. 9A

| City | Year | Margin    Sales Amount | Sale revenue |
|---|---|---|---|
| Austin | 2009 | | 3930 |
| Austin | 2011 | | 9861.9 |
| Austin | 2010 | | 498 |
| Boston | 2009 | | 422.5 |
| Boston | 2011 | | 12677.1 |
| Boston | 2010 | | 1656.2 |
| Colorado Springs | 2009 | | 1087 |
| Colorado Springs | 2011 | | 6724 |
| Colorado Springs | 2010 | | 2988 |
| Chicago | 2010 | | 4890.4 |
| Chicago | 2009 | | 2281 |
| Chicago | 2011 | | 18406.1 |
| Dallas | 2009 | | 1550.9 |
| Dallas | 2011 | | 10994.6 |
| Dallas | 2010 | | 5695.6 |
| Houston | 2009 | | 13332.1 |
| Houston | 2011 | | 28733 |
| Houston | 2010 | | 129 |
| Los Angeles | 2009 | | 5954.2 |
| Los Angeles | 2011 | | 17585.2 |
| Los Angeles | 2010 | | 5277.2 |

FIG. 9B

| City | Year | Margin | Sale revenue | Sales Amount |
|---|---|---|---|---|
| Austin | 2009 | 3097.9 | 9861.9 | 5200 |
| Austin | 2011 | 230.8 | 498 | 200 |
| Austin | 2010 | 153.6 | 422.5 | 200 |
| Boston | 2009 | 4092.1 | 12677.1 | 6100 |
| Boston | 2011 | 555.4 | 1656.2 | 700 |
| Boston | 2010 | 150.7 | 1087 | 900 |
| Colorado Springs | 2009 | 1741.2 | 6724 | 3800 |
| Colorado Springs | 2011 | 1328.2 | 2988 | 1200 |
| Colorado Springs | 2010 | 2116.5 | 4890.4 | 2000 |
| Chicago | 2010 | 1165.8 | 2281 | 1000 |
| Chicago | 2009 | 6944.3 | 18406.1 | 7900 |
| Chicago | 2011 | 823.4 | 1550.9 | 700 |
| Dallas | 2009 | 3848.3 | 10894.6 | 5100 |
| Dallas | 2011 | 2303.8 | 5695.6 | 2500 |
| Dallas | 2010 | 5759 | 13332.1 | 7100 |
| Houston | 2009 | 9749.6 | 28733 | 14400 |
| Houston | 2011 | 19.3 | 129 | 100 |
| Houston | 2010 | 2790.2 | 5954.2 | 3000 |
| Los Angeles | 2009 | 6571.7 | 17585.2 | 8200 |
| Los Angeles | 2011 | 175.6 | 527.2 | 300 |
| Los Angeles | 2010 | | | |

FIG. 9C

| City | Year | Margin | Sale revenue | Sales Amount |
|---|---|---|---|---|
| Austin | 2009 | | | 200 |
| Austin | 2011 | | | 200 |
| Austin | 2010 | 230.8 | 498 | |
| Boston | 2009 | 153.6 | 422.5 | |
| Boston | 2011 | 4092.1 | 12677.1 | 6100 |
| Boston | 2010 | 555.4 | 1656.2 | 700 |
| Colorado Springs | 2009 | 150.7 | 1087 | 900 |
| Colorado Springs | 2011 | 1741.2 | 6724 | 3800 |
| Colorado Springs | 2010 | 1328.2 | 2988 | 1200 |
| Chicago | 2010 | 2116.5 | 4890.4 | 2000 |
| Chicago | 2009 | 1165.8 | 2281 | 1000 |
| Chicago | 2011 | 6944.3 | 18406.1 | 7900 |
| Dallas | 2009 | 823.4 | 1550.9 | 700 |
| Dallas | 2011 | 3848.3 | 10994.6 | 5100 |
| Dallas | 2010 | 2303.8 | 5695.6 | 2500 |
| Houston | 2009 | 5759 | 13332.1 | 7100 |
| Houston | 2011 | 9749.6 | 28733 | 14400 |
| Houston | 2010 | 19.3 | 129 | 100 |
| Los Angeles | 2009 | 2790.2 | 5954.2 | 3000 |
| Los Angeles | 2011 | 6571.7 | 17583.2 | 8200 |
| Los Angeles | 2010 | 175.6 | 527.2 | 300 |

FIG. 9D

GESTURE-BASED VISUALIZATION OF DATA GRID ON MOBILE DEVICE

BACKGROUND

The present invention relates to user interfaces, and in particular, to gesture-based visualization of a data grid.

Unless otherwise indicated herein, the approaches described in this section are not prior art to the claims in this application and are not admitted to be prior art by inclusion in this section.

Data is commonly presented by a user interface as a grid comprising rows and columns. However, a conventional data grid may not facilitate visualization and exploration of the data under mobile viewing scenarios, e.g., involving display on a touch screen of limited area, with unreliable/slow connection back to a central content-hosting server.

For example, a mobile scenario may call for a user to quickly obtain a visualization of existing data. Such data viewing/exploration may be more casual than the detailed analysis typically involved for non-mobile applications. In particular, mobile applications may call for the user to understand the data set by manipulating rows and columns of the data grid, without actually editing or making changes to the underlying data itself.

A conventional data grid interface, however, may not facilitate a user's obtaining a quick-content-grasp of the grid data. Rather, formation of a data grid visualization and exploration of that data grid may comprise separate workflows, with relatively few resources allocated to the data exploration role.

It is also noted that data is typically organized in a database according to larger data structures including measures and dimensions. Often, a user may seek to form a rapid understanding of database data by comparing two measures, or by comparing amongst multiple measures. A conventional data interface, however, does not facilitate rapid performance of such analysis on a mobile device.

SUMMARY

A mobile device user may rapidly and naturally explore data received in a data grid from a database. An engine within the mobile device is configured to receive the database data including dimensions and measures, in a grid format comprising rows and columns of numerals. In response to one of a suite of user gestures (e.g., vertical swipe, horizontal swipe, slant swipe, drag-and-drop) recognized at the mobile device, the engine may modify the data grid to provide a visualized data grid featuring more than just rows and columns of numerals. This visualized data grid is provided based upon the original data grid, without the user device having to re-access the remote database server.

In one example, a user may touch swipe down a column of the data grid. This gesture may result in the engine displaying that data grid column information in vertical bar chart form, rather than exclusively as numerical values.

In another example, a user may touch swipe along a row of the data grid. This gesture may result in the engine displaying a data grid comprising information of that row in horizontal bar chart form, rather than exclusively as numerical values.

A mobile device may recognize a suite of user gestures to afford a visualization for exploring a data grid on a mobile device. For example, a user may slant swipe in a diagonal motion across the data grid. This gesture may result in the engine displaying the information of multiple rows and columns in bar chart form.

Another possible user gesture is a drag-and-drop. For example, in response to a user dragging and dropping one column into another, horizontal bar visualizations may be combined into stacked horizontal bar charts that serve to rapidly apprise the user of a relative magnitude of the information in the two columns.

According to an embodiment, a computer-implemented method comprises a mobile device storing a data grid comprising numerical values arranged in rows and columns. A functional module of the mobile device receives a user gesture in the data grid displayed by the mobile device. In response to the gesture, the function module generates a data grid visualization comprising a visual representation in place of a numerical value.

A non-transitory computer readable storage medium embodies a computer program for performing a method comprising a mobile device storing a data grid comprising numerical values of database measures arranged in rows and columns, wherein a column corresponds to single measure. A functional module of the mobile device receives a user gesture in the data grid displayed by the mobile device. In response to the gesture, the function module generates a data grid visualization comprising a visual representation in place of a numerical value.

An embodiment of a computer system comprises one or more processors and a software program executable on said computer system. The software program is configured to cause a mobile device to store a data grid comprising numerical values arranged in rows and columns. The software program is further configured to cause a functional module of the mobile device to receiving a user gesture in the data grid displayed by the mobile device. In response to the gesture, the software program is further configured cause the function module to generate a data grid visualization comprising a visual representation in place of a numerical value.

In certain embodiments, the gesture comprises a swipe in a column of the data grid.

According to some embodiments, the visual representation comprises a bar.

In various embodiments, the gesture comprises a swipe in a row of the data grid.

In particular embodiments the visual representation comprises a stacked bar comprising a plurality of measures.

According to some embodiments the gesture comprises a diagonal swipe, or a drag and drop.

In certain embodiments the functional module comprises a gesture recognition engine configured to reference an event listener, and a visualization engine configured to generate the data grid visualization based upon an output of the gesture recognition engine.

Various embodiments may further comprise the functional module of the mobile device receiving another user gesture in the data grid visualization displayed by the mobile device, and in response to the other gesture, the function module generating another data grid visualization comprising a combination of visual representations.

In particular embodiments a column of the visualized data grid corresponds to a measure.

The following detailed description and accompanying drawings provide a better understanding of the nature and advantages of the present invention.

BRIEF DESCRIPTION OF THE DRAWINGS

FIG. 4 shows an example of a data grid.

FIGS. 5A-5D show examples of data grid visualization based upon a user's vertical swipe gesture, and a user's horizontal swipe gesture.

FIGS. 6A-B illustrate an example of data grid visualization based upon a slant swipe gesture.

FIG. 8 illustrates an example of code implementing event listeners according to an embodiment.

FIGS. 9A-E illustrate an example of gesture-based data grid visualization according to an embodiment.

DETAILED DESCRIPTION

Described herein are techniques utilizing gesture-based visualization of data grid on a mobile device. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Details regarding the gesture-based data visualization on a data grid, are now described. Embodiments recognize a natural gesture set that is built-up, to support a changed visualization of a data grid, ease of return back to an original data grid visualization.

Figure 1:
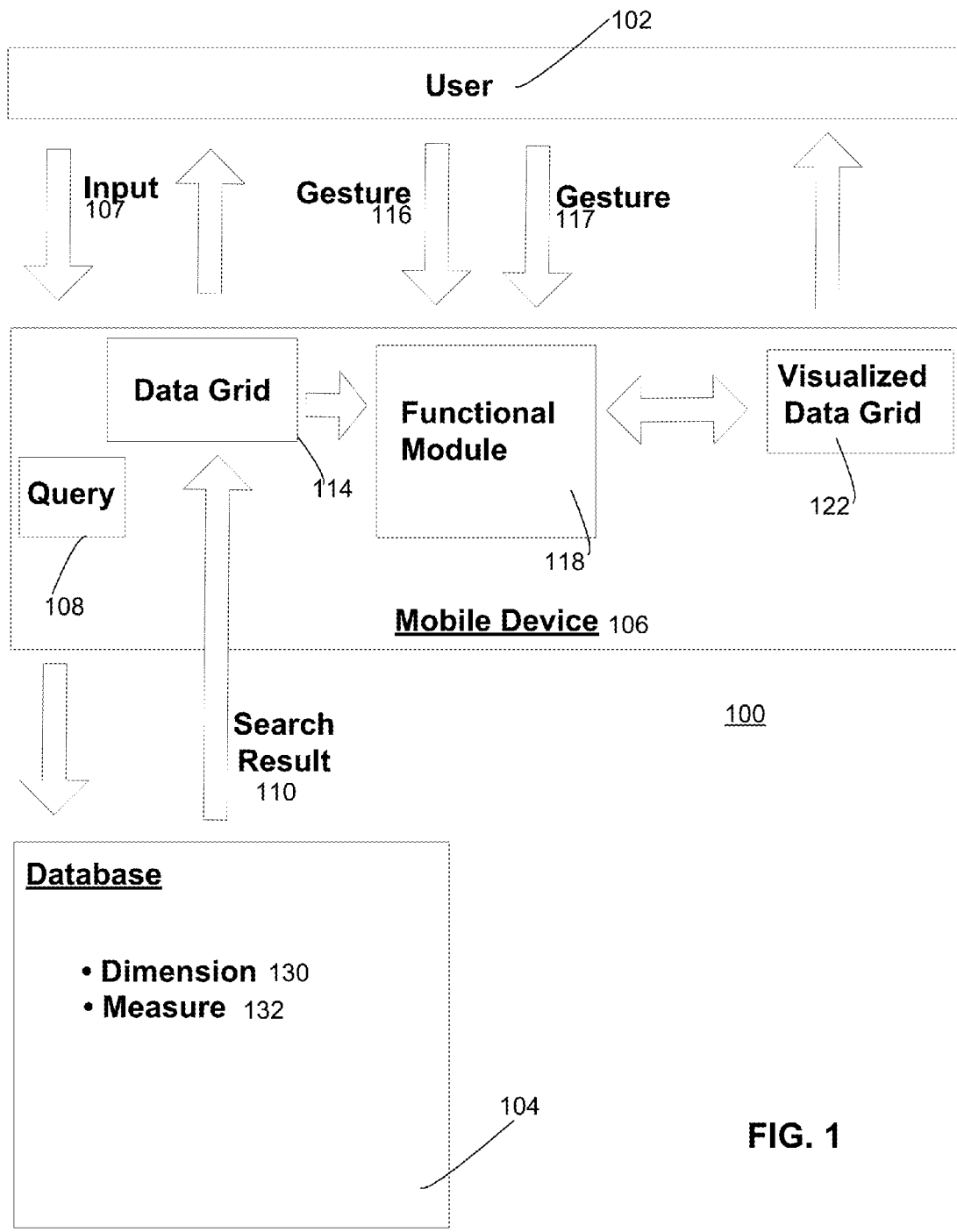
FIG. 1 illustrates an embodiment of a gesture-based visualization system according to an embodiment.

FIG. 1 illustrates a simplified view of a system 100 configured to implement gesture-based visualization of a data grid according to an embodiment. Specifically, a user 102 is in communication with data stored in a database 104, utilizing a mobile device 106. In certain embodiments, the mobile device may be in communication with the remote database on a server side.

The database is configured to store data organized according to larger data structures, which are sometimes called data objects. One component of a data structure is a dimension 130, which identifies a particular type of related data. An example of a dimension is a city in which sales revenue took place. Another example of a dimension is a year in which sales revenue took place.

A data structure may also comprise a measure 132. A measure identifies a measured quantity that is stored in the database and relevant to one or more dimensions. One example of a measure is sales revenue (e.g., a $ amount). Another example of a measure is a margin of profit.

The user is configured to provide input 107 to the mobile device in order to obtain data from the database. The mobile device layer then transmits this request for data to the database for processing.

In response, the database layer returns to the mobile device, a search result 110. This search result comprises database data that is relevant to the search.

The mobile device receives the search result, and generates therefrom a data grid 114. The data grid comprises rows and columns of numerical values.

The application layer then provides this data grid to the user for his or her review. Upon reviewing the data grid, the user may seek to gain further insight by obtaining an enhanced visualization of the data in the data grid.

Accordingly, the user provides input to the mobile device in the form of a gesture 116. As discussed in detail below, a functional module 118 of the mobile device may recognize the gesture as one of a suite of gestures upon which visualization may be based. Examples of such recognized gestures can include but are not limited to a vertical finger swipe, a horizontal finger swipe, a slant (diagonal) finger swipe, and a drag-and-drop motion.

Based upon the recognized gesture, the function module may generate a visualized data grid 122. As is also discussed in detail below, this visualized data grid may comprise in addition to numerical values, a representation in the form of a horizontal or vertical bar or other image.

The mobile device then presents the visualized data grid for the user's review. Based upon representations present within the data grid visualization, a user may be able to more quickly grasp and recognize relationships between data of the data grid, for example the relative magnitudes of different measures.

Although not explicitly shown in FIG. 1, a user may return to the original data grid by providing another gesture to the mobile device. In certain embodiments, this follow-up gesture may be a repeat of the original gesture. In some embodiments, this follow-up gesture may be a reverse of the original gesture.

Figure 2:
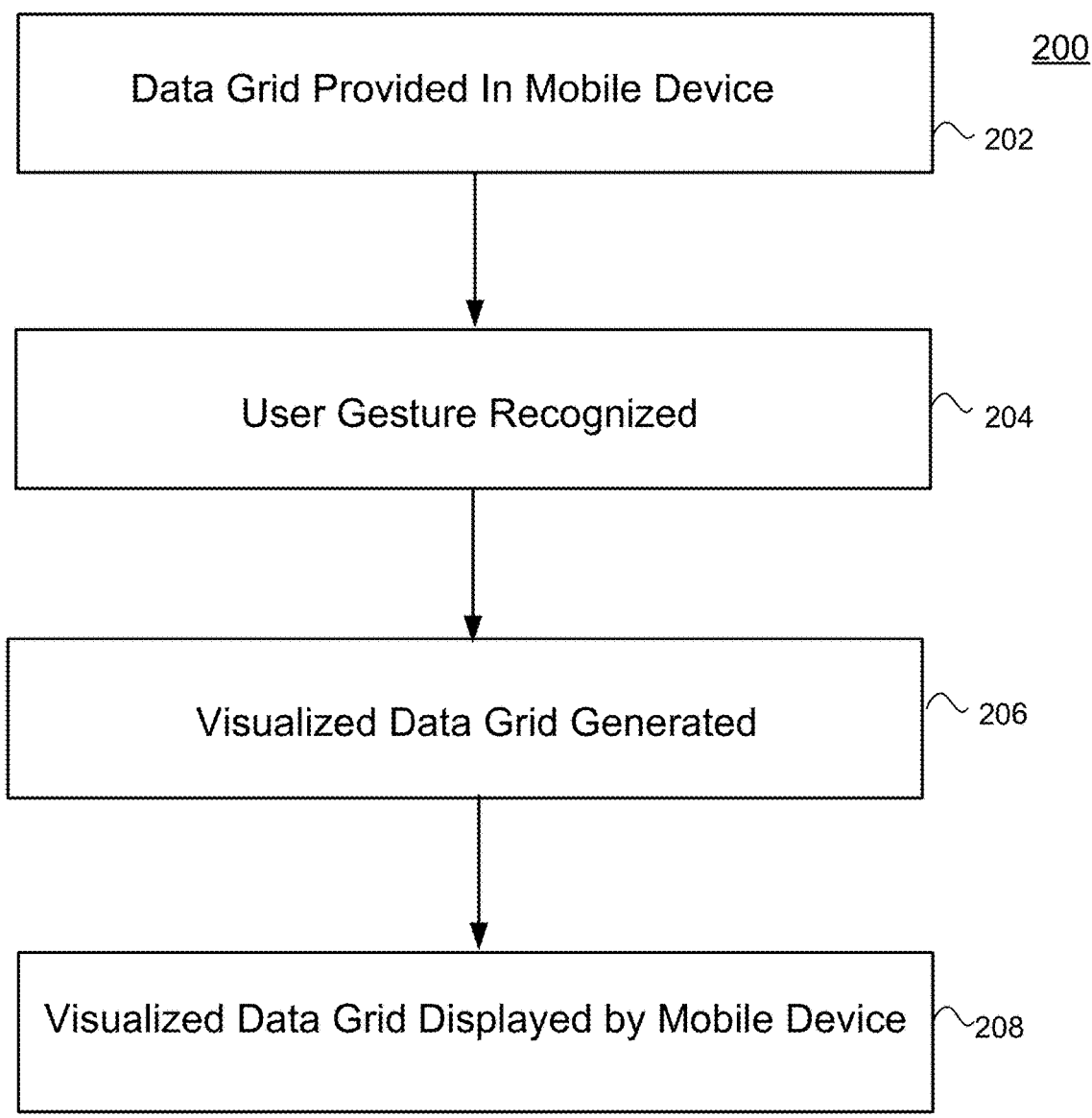
FIG. 2 illustrates a simplified process flow according to an embodiment.

FIG. 2 illustrates a simplified flow of an embodiment of a process 200 for providing a data grid visualization in response to a user gesture. In a first step 202, a data grid comprising dimensions and measures of a search result responsive to a database query, is provided in a mobile device.

In a second step 204, a functional module within the mobile device receives a gesture from the user. In a third step 206, the functional module recognizes the gesture, and in response generates a visualized data grid from the existing data grid. In a fourth step 208, the mobile device displays the visualized data grid for inspection by the user.

Figure 3:
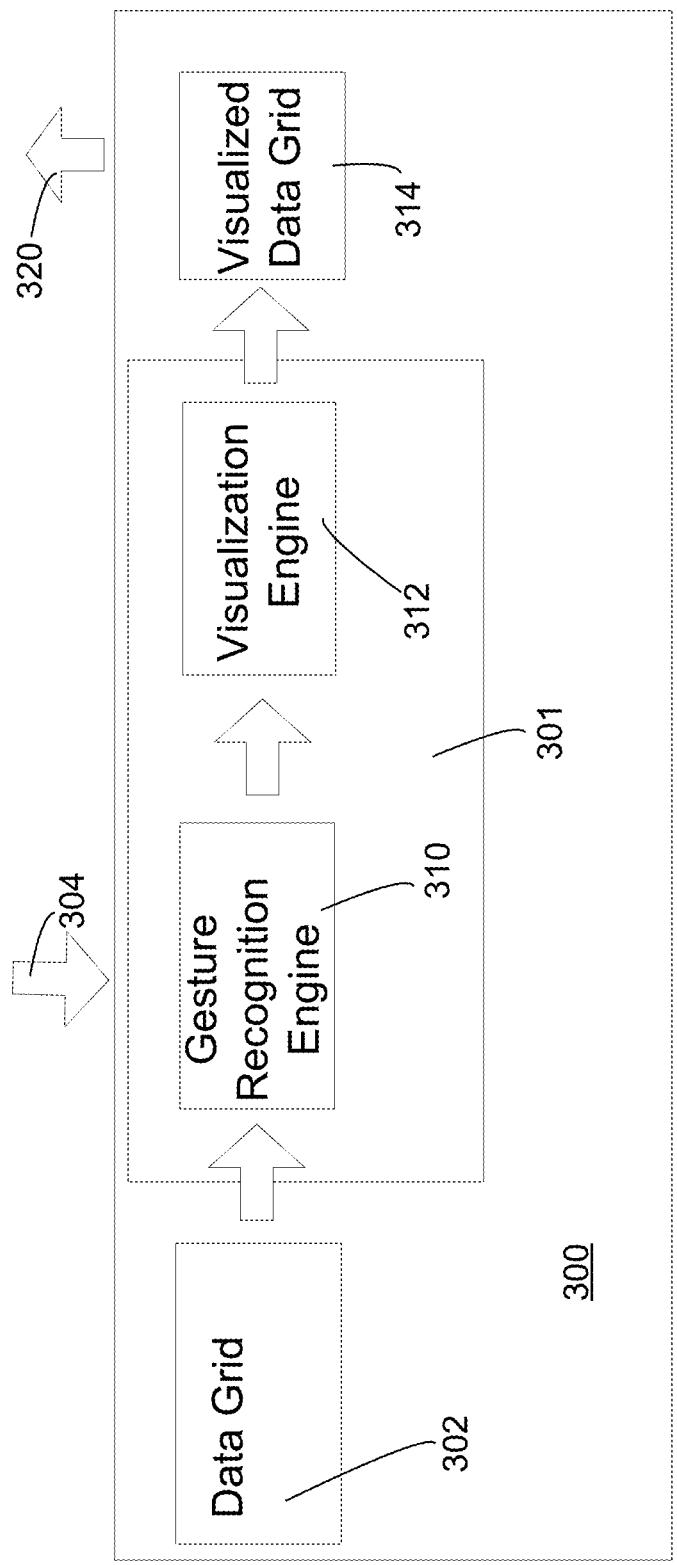
FIG. 3 illustrates an enlarged view of an embodiment of a functional module.

Details regarding gesture-based visualization of a data grid on a mobile device, according to embodiments, are now described in connection with FIG. 3. In particular function module 301 is present within mobile device 302, and includes both a gesture recognition engine 310, and a visualization engine 312.

A data grid 302 is stored in the mobile device. FIG. 4 shows a view of one example of a simplified data grid comprising numerical values xxx of measures arranged in rows and columns.

The gesture recognition engine receives as inputs, a gesture 304 from a user, and the data grid 302 stored in the mobile device. Based on this input, the gesture recognition engine communicates an output 311 to the visualization engine. In certain embodiments, this output may triggered by code implementing event listening.

The visualization engine receives the output of the gesture recognition engine. In response, it generates a visualized data grid 314 reflecting the gesture input to the original data grid. According to various embodiments, data of the visualized data grid may be represented in the form of a vertical bar, a horizontal bar, or others. This visualization affords a user with insight to recognize relationships between database data of the data grid.

Figure 5A:
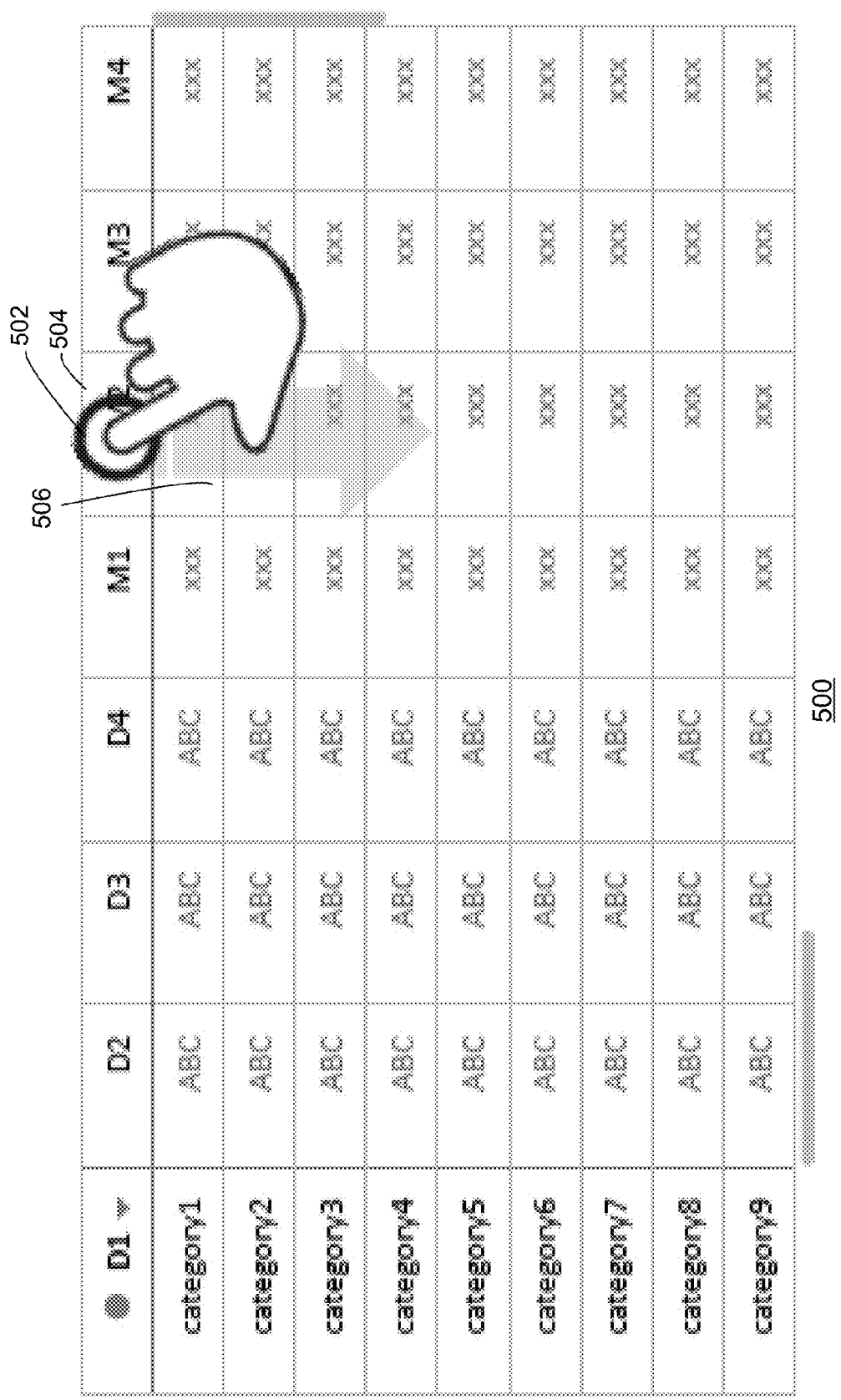

FIG. 5A shows a simplified view of a user gesture comprising a vertical swipe within a column of a data grid being displayed on the mobile device. Specifically, in order to visualize data of a single column of the grid 500, FIG. 5A shows the user initiates the input by touching a trigger point 502 located at a column title 504. The user then completes the gesture by swiping on the column 506 from top to bottom.

Figure 5B:
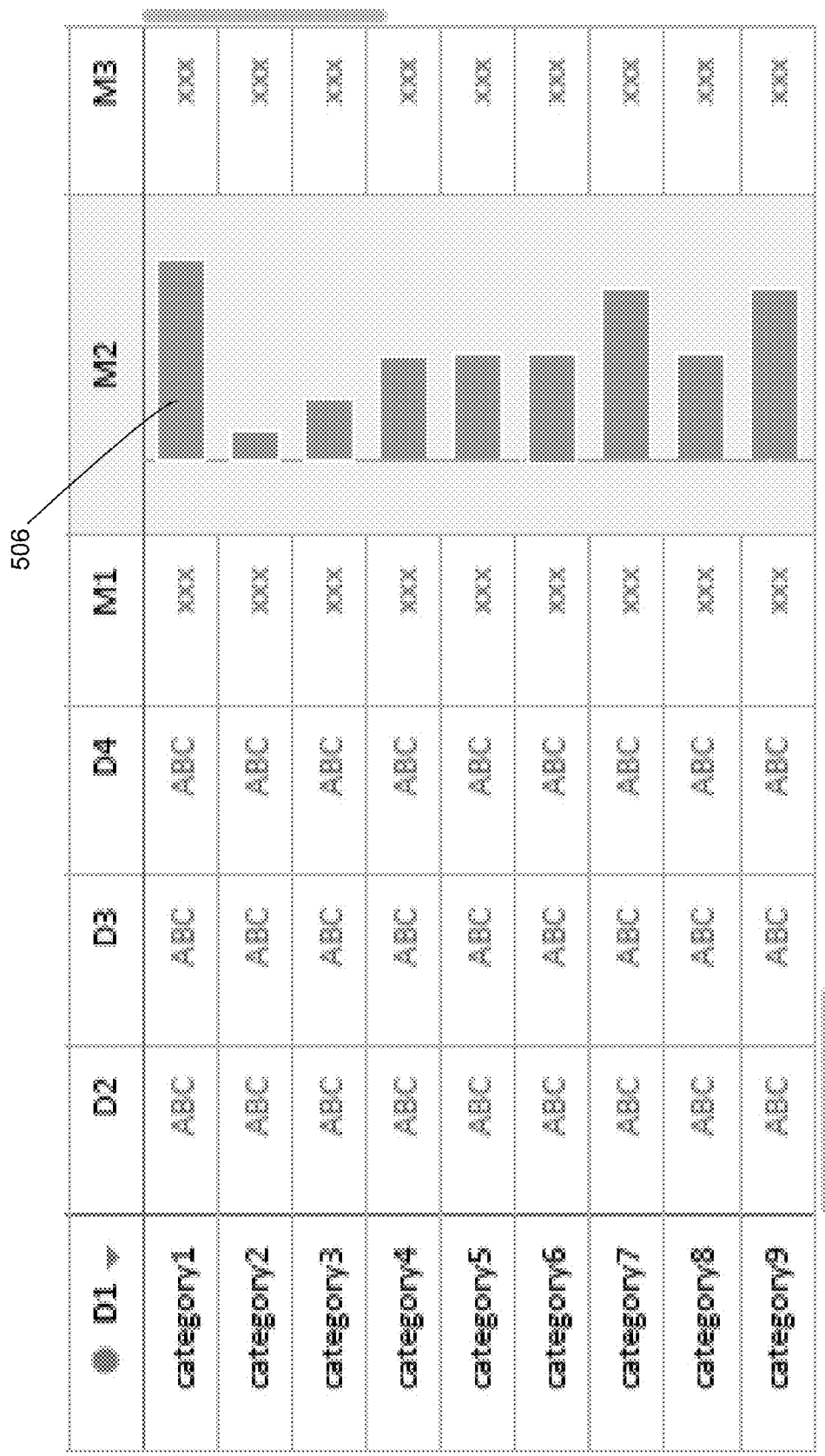

FIG. 5B shows the new visualization 508 of the data grid resulting from the gesture. In particular the display of the measure M2 across multiple rows is changed from numerical values, to a series of horizontally-oriented bars. The length of the bar indicates its magnitude relative to the other measures.

In this manner, with a simple vertical swiping gesture, a user is quickly afforded a visually appealing relative comparison of the relative magnitudes of the measure across different rows. Swiping down the column in the same manner again, may return visualization of the data grid back to the original form shown in FIG. 4.

Figure 5C:
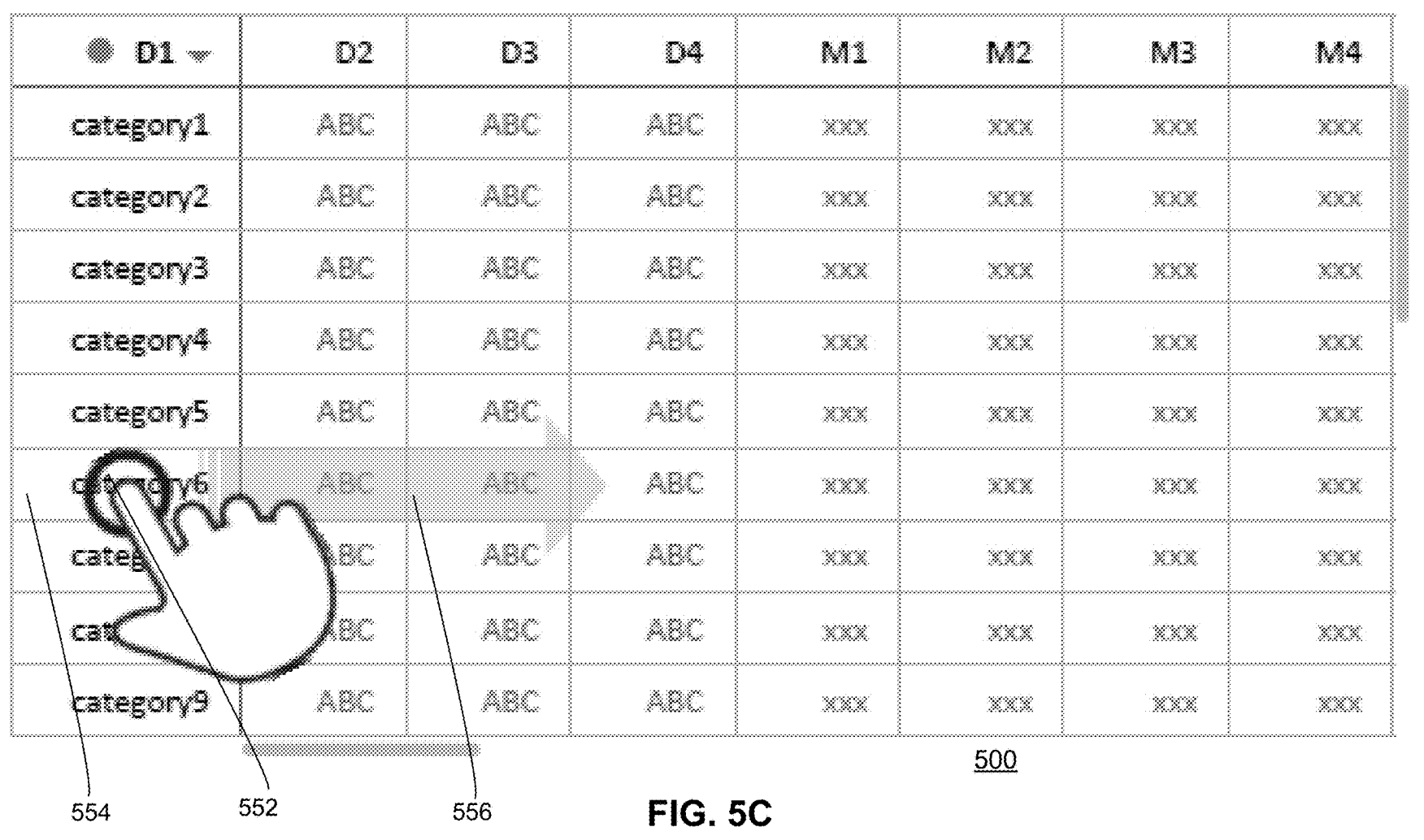

Gesture-based visualization of a row of a data grid may also be possible. FIGS. 5C-D show an example of such an embodiment.

Specifically, in order to visualize data of a single row of the grid 500, FIG. 5C shows the user initiates the input by touching a trigger point 552 located at a row title 554. The user then completes the gesture by swiping on the row 556 from left to right.

FIG. 5D shows the corresponding new visualization 558 of the data grid resulting from the gesture. In particular, the display of the measures M1-4 is changed from numerical values occupying a plurality of fields, to a horizontally-oriented stacked bar that is segmented into different colors and lengths, together with text label identifying the measure represented by each bar. The length of the bar segment indicates its magnitude relative to the other measures. Also, the bar segments are presented from left-to-right in the same order in which the numerical value fields originally appeared.

In this manner, with a simple horizontally swiping gesture, a user is quickly afforded a visually appealing relative comparison of the relative magnitudes of the measures in the row. Swiping along the row in the same manner again, may return visualization of the data grid back to the original form shown in FIG. 4.

Figure 6A:
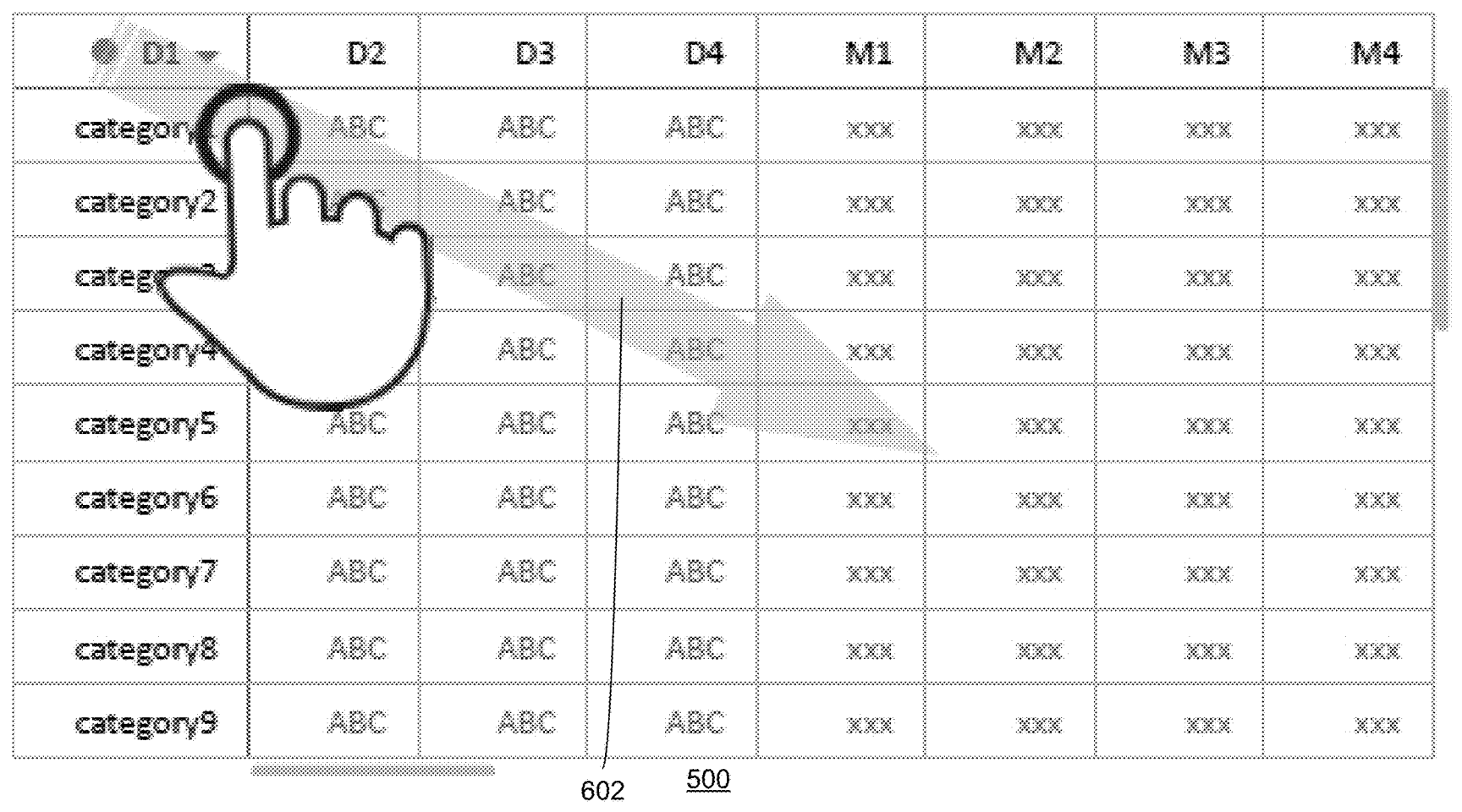

While FIGS. 5C-D show the gesture-based visualization of a single row, this is not required. In certain embodiments a gesture may allow visualization of a plurality of rows. FIGS. 6A-6B are simplified views of such an embodiment.

Specifically, in order to visualize data of a plurality of rows of the grid 500, FIG. 6A shows the user provides the input by swiping in a diagonal or slanted motion 602, across the data grid.

FIG. 6B shows the new visualization 604 of the data grid resulting from the gesture. In particular, the display of the measures M1-4 in each of the rows is changed from numerical values occupying a plurality of fields, to horizontally-oriented stacked bars that are each segmented into different colors and lengths, together with text label identifying the measure represented by each bar. The length of the bar segment indicates its magnitude relative to the other measures. Also, the bar segments are presented from left-to-right in the same order in which the numerical value fields originally appeared.

In this manner, with a simple slanted swiping gesture, a user is quickly afforded a visually appealing relative comparison of the relative magnitudes of the measures across all rows. Swiping along the row in the same (slanted) manner again, may return visualization of the data grid back to the original form shown in FIG. 4.

Alternative forms of gesture-based visualization are possible according to embodiments. For example, other natural gestures may be deployed to assist in the comparison of multiple columns/rows of data.

Figure 7A:
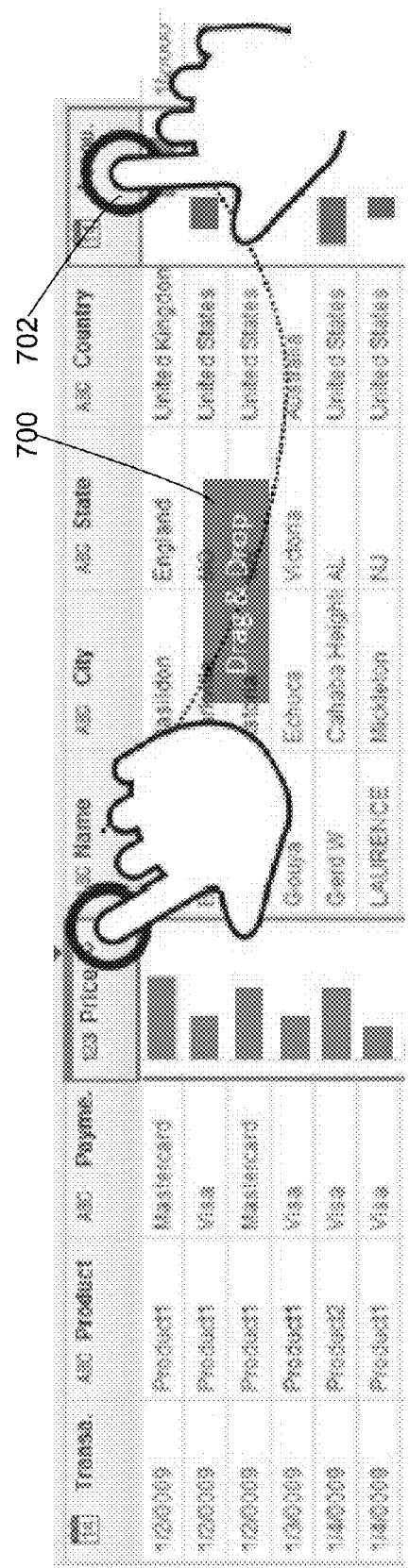
FIGS. 7A-B illustrate an example of data grid visualization based upon a drag-and-drop gesture.
Figure 7B:
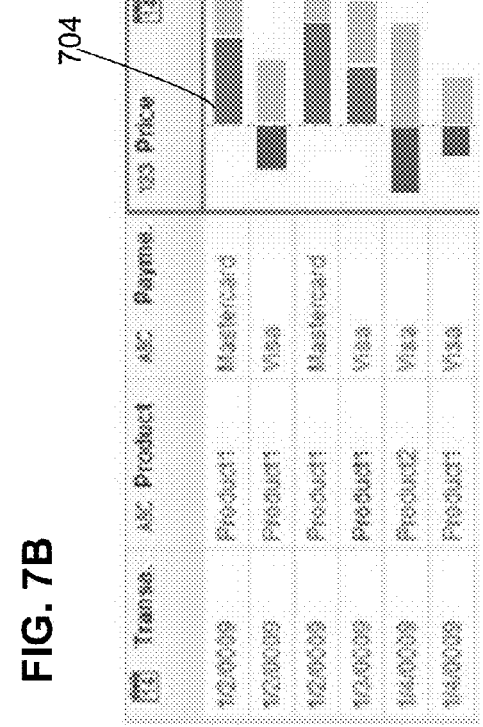

FIGS. 7A-B thus show a combined visualization approach. In particular, providing an additional user gesture to a visualized data grid, may result in generation of a further visualized data grid.

Specifically, FIG. 7A shows a visualized data grid in which two columns have previously been transformed into bar chart representations (e.g., based upon the recognition of vertical swipe gestures within respective columns). By a further drag and drop gesture 700 of the user at a trigger point 702 at an upper right/left and lower right/left corner of the data grid, a second column is moved to the location of the first column.

FIG. 7B shows a result of this drag and drop gesture. Specifically, a first column representing a first measure, is joined with a second column representing another measure, producing a stacked visualization 704.

Here, the resulting stacked visualization is in the form of horizontal bars oriented relative to an origin point. Color and/or position of the combined bars may indicate the measure (e.g., Price, Account) with which they are affiliated. A composite header created for the visualized column may also aid a user in recognizing the source of the visualized data.

In certain embodiments, the visualization of only a single row/column may be changed at a time. When a new visualization for a different row/column is desired, the previously stacked visualization may roll back to the original form.

EXAMPLE

An example of implementation of gesture-based data visualization is now illustrated in connection with a specific data grid. This data grid is shown in the following table.

| City | Year | Margin | Sale revenue | Sales Amount |
|---|---|---|---|---|
| Austin | 2009 | 1676.7 | 3930 | 2100 |
| Austin | 2011 | 3097.9 | 9861.9 | 5200 |
| Austin | 2010 | 230.8 | 498 | 200 |
| Boston | 2009 | 153.6 | 422.5 | 200 |
| Boston | 2011 | 4092.1 | 12677.1 | 6100 |
| Boston | 2010 | 555.4 | 1656.2 | 700 |
| Colorado Springs | 2009 | 150.7 | 1087 | 900 |
| Colorado Springs | 2011 | 1741.2 | 6724 | 3800 |
| Colorado Springs | 2010 | 1328.2 | 2988 | 1200 |
| Chicago | 2010 | 2116.5 | 4890.4 | 2000 |
| Chicago | 2009 | 1165.8 | 2281 | 1000 |
| Chicago | 2011 | 6944.3 | 18406.1 | 7900 |
| Dallas | 2009 | 823.4 | 1550.9 | 700 |
| Dallas | 2011 | 3848.3 | 10994.6 | 5100 |
| Dallas | 2010 | 2303.8 | 5695.6 | 2500 |
| Houston | 2009 | 5759 | 13332.1 | 7100 |
| Houston | 2011 | 9749.6 | 28733 | 14400 |
| Houston | 2010 | 19.3 | 129 | 100 |
| Los Angeles | 2009 | 2790.2 | 5954.2 | 3000 |
| Los Angeles | 2011 | 6571.7 | 17585.2 | 8200 |
| Los Angeles | 2010 | 175.6 | 527.2 | 300 |

This data grid includes two categories (City, Year). Each year includes three values (Margin, Sales Revenue, Sales Amount). To implement gesture-based data visualization of this data grid, the data context and event handling functions are defined as follows.

Data context and the dataset are defined as follows. The data context of each row and column is defined as:

```
var categoryAxisContext = {
            'categoryName': String
} //category context
var valueAxisContext = {
            'rowNumbe': Number
} //value context
```

The data table will add such context on each grid row and column. The data table will add a category axis' context on each category axis layer, and add a value axis' context on each value axis layer.

Event handling functions are defined as follows. As to chart, three event listeners are added as shown in FIG. 8. Each event will update the layout of data table and replace a selected row and/or column with the appropriate new visualization.

Details regarding visualization of a data table are now provided as follows. For column visualization, gesture recognition allows a user to swipe inside each column.

For this, an event is added onto each column's area. This event may comprise finger touch down inside the category axis layer:

columnswipein: a swipe event when the customer's finger is at axis layer and it swipes into data table region.
In this manner, the related valueContext could be obtained from the event.

A related column's context is to be bound on each rendering object. In this manner the context may be obtained when the event columnswipein is triggered.

Then, an event will be dispatched:
dispatch('showVisulizationOnValueAxis', valueAxisContext, false)
This is used to call the data table to draw bars.

Another recognized gesture is drag:
drag: a drag event will be fired when customer drags a column into a visualized column.
Then an event will be dispatched:
dispatch('showVisulizationOnValueAxis', valueAxisContext, true)
This is used to call the data table to draw bars.

An example of single column visualization of the data grid of the above table occurs as follows. Inline data table charts are created as follows.
1. If swiping in column Revenue, the data table will fire the event below.
dispatch('showVisulizationOnValueAxis', {'valueName': 'Margin}, false);
2. The data table will listen to this event, and obtain the value context. Then the table will obtain values from dataset according to this context. Also, table will retrieve this column container with this context.
3. The data table will call to draw a series of bar charts according to the values. These bar charts will be placed at the column container.
FIG. 9A shows the new data grid resulting from gesture-based single column visualization according to an embodiment. Here, the length of the horizontal bars represents the relative magnitude of the value.

As previously discussed, column combined visualization may also be gesture-based. Steps for creating inline data table charts are listed below.
1. A user drags the column 'Sales Amount' into the column 'Margin'. The data table will fire the event:
dispatch('showVisulizationOnValueAxis', {'valueName': 'Sales Amount'}, true);
2. The data table instance will listen to this event. It will change the original bar charts into stacked bar charts combining data from both columns FIG. 9B shows a sample of the result.

Gesture-based row visualization according to embodiments, is now discussed. Similar to the behavior of the value axis, the row axis may use the • rowswipein and • drag events to trigger the data table to draw charts.

The rowswipein is a swipe event when the customer's finger is at row axis layer and it swipes into data table region. Thus the related rowContext may be obtained from the event.

The related row's context is bound on each rendering object. This allows context to be obtained when the event rowswipein is triggered.

Then, an event will be dispatched:
dispatch('showVisulizationOnValueAxis', valueAxisContext, false)
This is used to call the data table to draw bars.

Gesture-based single row visualization is now discussed. The following are the steps for creating single stacked bar chart in single row.
1. If swiping in first row, the table will fire the event:
dispatch(showVisulizationOnCategoryAxis, {'rowNumber': 1}, false);
2. The gird instance will listen to this event and obtain the value context. Values will be obtained from the dataset according to this context. The data table will retrieve this row container with this context.
3. The data table will call to draw a series of stacked bar charts according to the values. The data table will place the stacked bar charts at the row container. FIG. 9C shows a new gesture-based single row visualization according to an embodiment.

Combined row visualization based upon gesture is also possible. The following lists steps for creating combined charts in a data-table:
1. A user drags a second row into a first row. The data table will fire the event:
dispatch('showVisulizationOnCategoryAxis', {'rowNumber': 2}, true);
2. A data table instance will listen to this event, and change the original stacked bar charts into series stacked bar chart. FIG. 9D shows the new resulting data grid visualization.

Finally, overall gesture-based data-table visualization is also possible. Specifically, by swiping from data table's top left to bottom right, a user can implement a new visualization on the entire data gird.

An event is added onto entire data table area:
slantswipe: a swipe event when the customer's finger is start at table's top left area and direction to data table's bottom left will be defined as a swipe cross table event.
Then an event will be dispatched:
dispatch('showEntireTable')
This is used to call the data table to draw bars.

Here, the table defines the start area of this finger swipe. In a particular embodiment, the data grid to be visualized may comprise a width W, and a height H, with the origin (W=0, H=0) located at the top left corner.

Maximum acceptable areas for the slant gesture leading to combined visualization, may then be defined within parameters W and H. Thus, the data table will fire the event to draw a new visualization, only when a user's finger moves in a slanted (diagonal) manner to opposite corners of the grid.

The user's entire finger movement on the data table will be recorded. Once the finger is removed from the touchscreen, the event handler will calculate the movement direction.

If the entire touch gesture follows one direction, and the time from touch end to touch start is no longer than 200 ms, then a 'swipecrosstable' event will be fired. An example of this algorithm in JavaScript appears as follows:

```
/** pseudocode
 * Check series of the touchEvent is swipe across the table
 * @param {Object} startPoint, touch point in coordinate axis.
For example: {x: 12, y: 23, timeStamp: 1400120943331}
 * @param {Array} touchMovesPoint, Array of the
touchmoves point, each point structure is same with start point. Last
element should be the touch end point.
 * @return {Boolean} return true if this is a swipe across table's
   event.
*/
checkIsCrossTable= function(startPoint, touchMovesPoint){
   var length = touchMovesPoint.length;
   var lastPoint = startPoint;
   //Check if the startPoint is inside allowed area
   var position = chekPosition(startPoint);
   var startTime = startPoint.timeStamp;
   //Use direction to check if the finger movement is a accept
   swipe
   var isDirectionAllowed = directionIsAllowed(position,
   touchMovesPoint);
   //Make sure the entire gesture is shorter than 200ms.
   if(isDirectionAllowed && lastPoint.timeStamp −
   startTime < 200){
      return true;
   }
   return false;
};
```

Figure 9E:
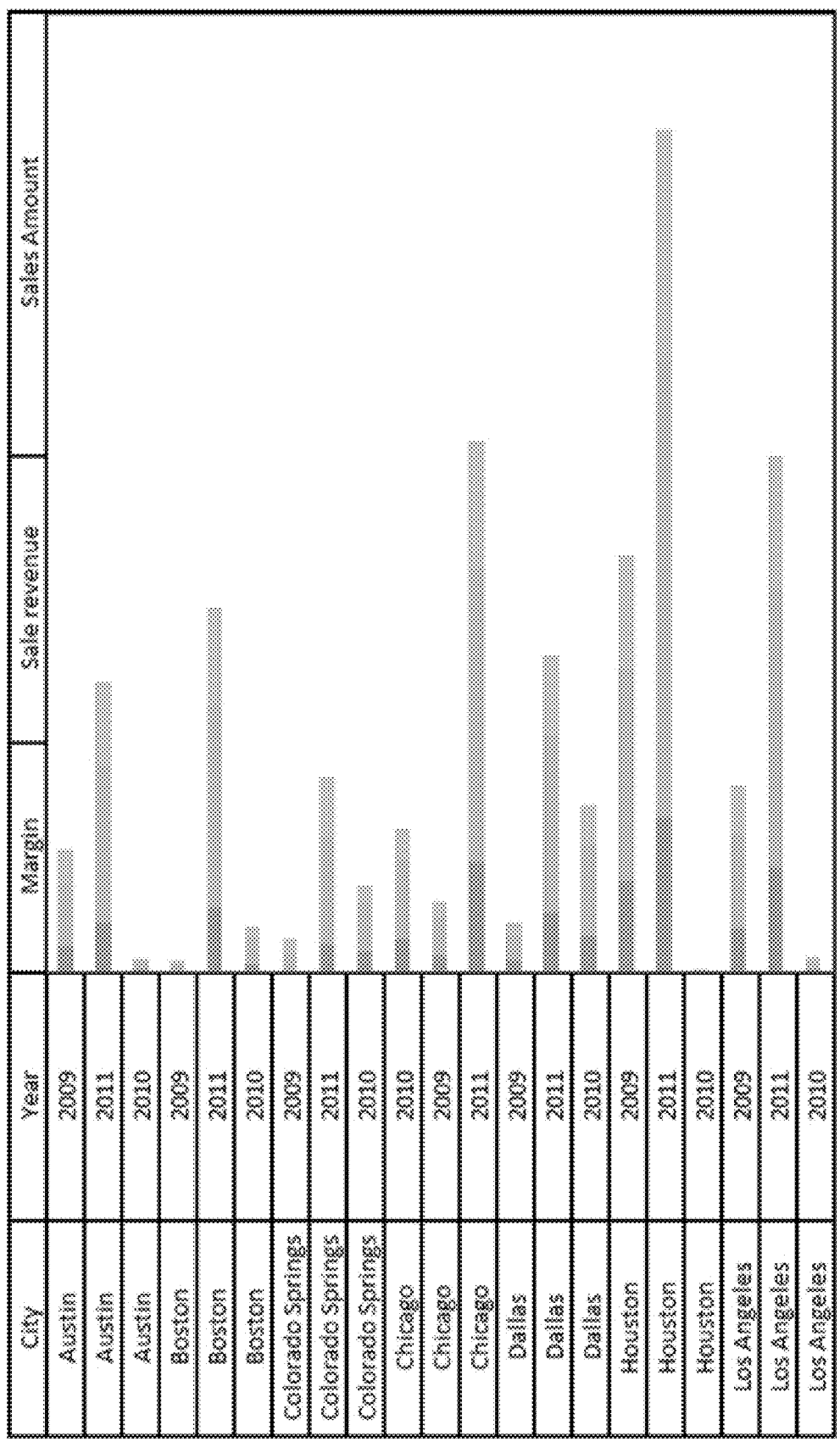

As mentioned previously, a gesture-based overall data grid visualization according to embodiments, may result in a transformation of value data into charts. The table charts may be created according to the following steps.
1. If the gesture of swiping across the grid is determined to have occurred, the table will fire event:
   dispatch('showEntireTable');
2. The grid instance will listen to this event. Then, it will draw a series of stacked bar charts with the values inside the data table. An example of this new visualization is shown in FIG. 9E.

One feature that may be offered by certain embodiments of gesture-based visualization, is the ability to allow a mobile user to easily rollback to the original visualization. According to some embodiments, where a user swipes on the selected rows or columns again, the table will remove the related visualization and return again to the default data table.

The following steps allow a user to revert to original visualization from a new overall visualization (e.g., FIG. 9E).
1. The user slant swipes the on the data table again. The data table will fire event:
   dispatch('showEntireTable')
2. The data table will listen to this event. Where it is found that the whole visualization is already shown, the table will remove the visualization and set back to normal.
3. The user can then move to implement a new visualization of data table by making another gesture.

In summary embodiments recognize a set of natural gestures in support of rapid exploration of data in a data grid utilizing a new visualization, and also reversion back to an original visualization of the data grid. In certain embodiments, swiping within a row may create a new visualization of data within that row. Swiping within a column may create a new visualization of data within that column. Swiping diagonally in a slant across the grid may result in a new visualization of the entire grid. A natural drag-and-drop gesture may allow comparison between multiple columns and rows of data in the grid.

Gesture-based visualization of a data grid according to embodiments may offer one or more benefits. One potential benefit is recognition of simplified and natural viewing behaviors allowing a user to easily observe the data from multiple perspectives, and to form insights therefrom. Embodiments may enlarge a chart or dashboard application's ability to provide charting exploration for a complex datasets.

Another possible benefit of gesture-based data grid visualization according to embodiments, is a lack of reliance upon the ongoing integrity of communications between the mobile device and the database hosted on the remote server. That is, in order to accomplish visualization, embodiments rely upon data of the data grid already stored in the mobile device. In order to provide a user with an opportunity to further explore data of the data grid in a meaningful way, the mobile device need not maintain communication with the remote server in a continuous manner.

Embodiments are not restricted to those specifically enumerated above. For example, visualizations comprising other than horizontal bars (e.g. vertical bar charts, pie charts) could be provided according to user gesture. As another example, embodiments are not limited to the specific directions of swiping (e.g., top-to-bottom, left-to-right) described herein, and user gestures performed in other swiping directions (e.g., bottom-to-top, right-to-left) may be recognized to produce new visualizations of a data grid according to particular embodiments. Similarly, while the above embodiments describe repetition of a gesture for rollback of a visualization, alternative embodiments could recognize other gestures (e.g., in the opposite direction) to implement a rollback.

Figure 10:
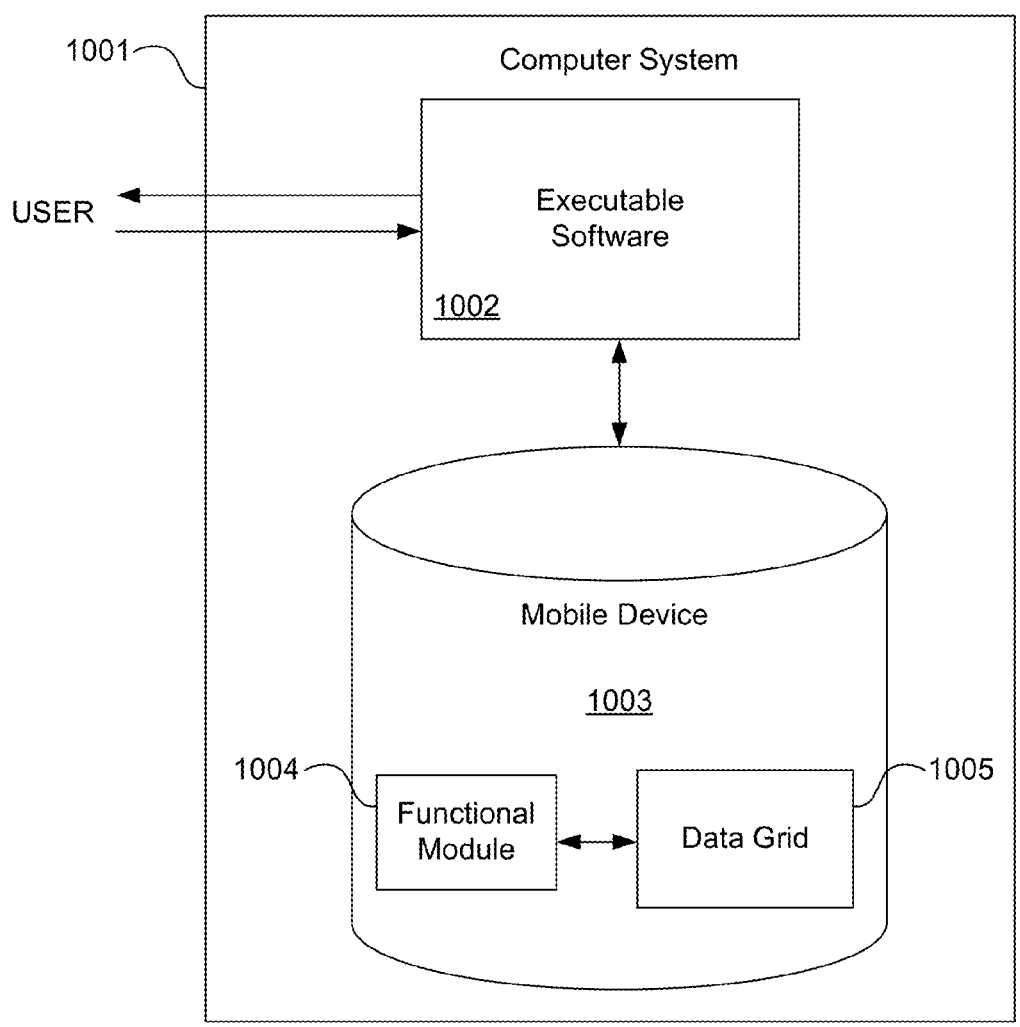
FIG. 10 illustrates hardware of a special purpose computing machine configured to implement data grid visualization according to an embodiment.

FIG. 10 illustrates hardware of a special purpose computing machine configured to perform visualization of a data grid according to an embodiment. In particular, computer system 1000 comprises a processor 1002 that is in electronic communication with a non-transitory computer-readable storage medium 1003 on a mobile device. This computer-readable storage medium has stored thereon code 1005 corresponding to a data grid returned from a database query. Code 1004 corresponds to a functional module. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 11:
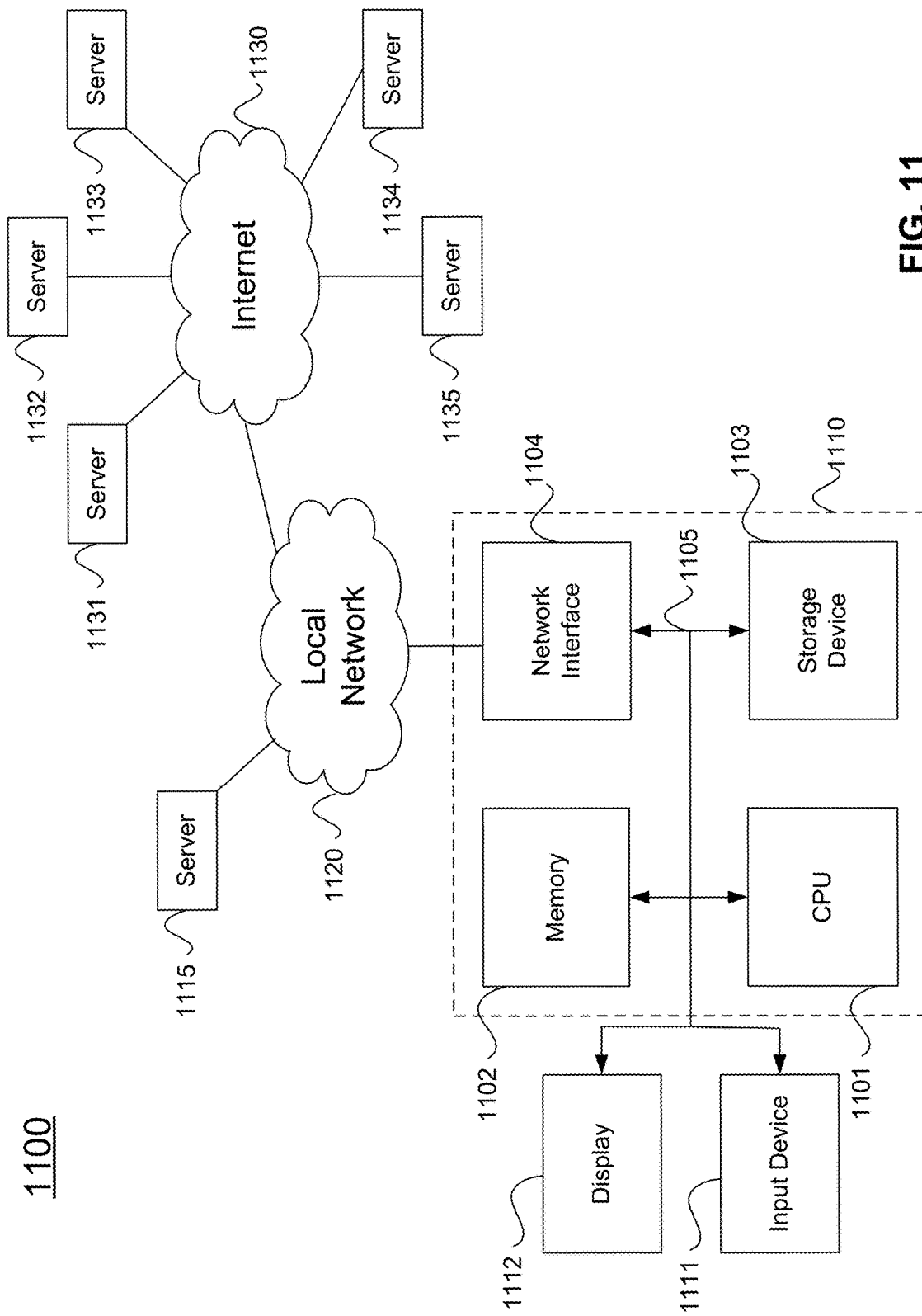
FIG. 11 illustrates an example of a computer system.

An example computer system 1110 is illustrated in FIG. 11. Computer system 1110 includes a bus 1105 or other communication mechanism for communicating information, and a processor 1101 coupled with bus 1105 for processing information. Computer system 1110 also includes a memory 1102 coupled to bus 1105 for storing information and instructions to be executed by processor 1101, including information and instructions for performing the techniques described above, for example. This memory may also be used for storing variables or other intermediate information during execution of instructions to be executed by processor 1101. Possible implementations of this memory may be, but are not limited to, random access memory (RAM), read only memory (ROM), or both. A storage device 1103 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1103 may include source code, binary code, or software files for performing the techniques above, for example. Storage device and memory are both examples of computer readable mediums.

Computer system 1110 may be coupled via bus 1105 to a display 1112, such as a cathode ray tube (CRT) or liquid crystal display (LCD), for displaying information to a computer user. An input device 1111 such as a keyboard and/or mouse is coupled to bus 1105 for communicating information and command selections from the user to processor 1101. The combination of these components allows the user to communicate with the system. In some systems, bus 1105 may be divided into multiple specialized buses.

Computer system 1110 also includes a network interface 1104 coupled with bus 1105. Network interface 1104 may provide two-way data communication between computer system 1110 and the local network 1120. The network interface 1104 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1104 sends and receives electrical, electromagnetic, or optical signals that carry digital data streams representing various types of information.

Computer system 1110 can send and receive information, including messages or other interface actions, through the network interface 1104 across a local network 1120, an Intranet, or the Internet 1130. For a local network, computer system 1110 may communicate with a plurality of other computer machines, such as server 1115. Accordingly, computer system 1110 and server computer systems represented by server 1115 may form a cloud computing network, which may be programmed with processes described herein. In the Internet example, software components or services may reside on multiple different computer systems 1110 or servers 1131-1135 across the network. The processes described above may be implemented on one or more servers, for example. A server 1131 may transmit actions or messages from one component, through Internet 1130, local network 1120, and network interface 1104 to a component on computer system 1110. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    a mobile device displaying a data grid comprising numerical values arranged in rows and columns of table cells, the columns including column headers;
    a functional module of the mobile device receiving a user drag gesture in the data grid displayed by the mobile device;
    in response to the user drag gesture, the function module generating a data grid visualization comprising a modified table cell combining multiple table cells, the modified table cell including a chart replacing numerical values of the multiple table cells; and
    the function module generating a composite header for a column including the modified table cell, the composite header replacing column headers of multiple table cells being combined and indicating a source of data of the modified table cell.

2. A method as in claim 1 wherein the visual representation comprises a bar.

3. A method as in claim 2 wherein the visual representation comprises a stacked bar comprising a plurality of measures.

4. A method as in claim 1 wherein the functional module comprises:
    a gesture recognition engine configured to reference an event listener; and
    a visualization engine configured to generate the data grid visualization based upon an output of the gesture recognition engine.

5. A method as in claim 1 further comprising:
    the functional module of the mobile device receiving another user gesture in the data grid visualization displayed by the mobile device; and
    in response to the other gesture, the function module generating another data grid visualization comprising a combination of visual representations.

6. A method as in claim 5 wherein the another gesture comprises a swipe in a column of the data grid.

7. A method as in claim 5 wherein the another gesture comprises a swipe in a row of the data grid.

8. A method as in claim 1 wherein a column of the visualized data grid corresponds to a measure.

9. A non-transitory computer readable storage medium embodying a computer program for performing a method, said method comprising:
    a mobile device displaying a data grid comprising numerical values of database measures arranged in rows and columns of table cells, the columns including column headers, wherein a column corresponds to single measure;
    a functional module of the mobile device receiving a user drag gesture in the data grid displayed by the mobile device;
    in response to the user drag gesture, the function module generating a data grid visualization comprising a modified table cell combining multiple table cells, the modified table cell including a chart replacing numerical values of the multiple table cells; and
    the function module generating a composite header for a column including the modified table cell, the composite header replacing column headers of multiple table cells being combined and indicating a source of data of the modified table cell.

10. A non-transitory computer readable storage medium as in claim 9 wherein the visual representation comprises a horizontal bar.

11. A non-transitory computer readable storage medium as in claim 10 wherein the horizontal bar comprises a stack of a plurality of measures.

12. A non-transitory computer readable storage medium as in claim 9 wherein the functional module comprises:
- a gesture recognition engine configured to reference an event listener; and
- a visualization engine configured to generate the data grid visualization based upon an output of the gesture recognition engine.

13. A non-transitory computer readable storage medium as in claim 9 wherein the method further comprises:
- the functional module of the mobile device receiving another user gesture in the data grid visualization displayed by the mobile device; and
- in response to the other gesture, the function module generating another data grid visualization comprising a combination of visual representations.

14. A computer system comprising:
- one or more processors;
- a software program, executable on said computer system, the software program configured to:
- cause a mobile device to display a data grid comprising numerical values arranged in rows and columns of table cells, the columns including column headers;
- cause a functional module of the mobile device to receiving a user drag gesture in the data grid displayed by the mobile device;
- in response to the user drag gesture, cause the function module to generate a data grid visualization comprising a modified table cell combining multiple table cells, the modified table cell including a chart replacing numerical values of the multiple table cells; and
- the function module generating a composite header for a column including the modified table cell, the composite header replacing column headers of multiple table cells being combined and indicating a source of data of the modified table cell.

15. A computer system as in claim 14 wherein the visual representation comprises a stacked bar of a plurality of measures.

16. A computer system as in claim 14 wherein the visual representation comprises a horizontal bar chart of a plurality of values of a same measure.

17. A computer system as in claim 14 wherein the software program is further configured to:
- cause the functional module of the mobile device to receive a drag-and-drop user gesture in the data grid visualization displayed by the mobile device; and
- in response to the drag-and-drop gesture, cause the function module to generate another data grid visualization comprising a combination of visual representations of a plurality of measures.

* * * * *